March 14, 1933.  S. BARBER  1,901,579
CHUCK FOR NUT TAPPING MACHINES
Filed July 25, 1930  4 Sheets-Sheet 1
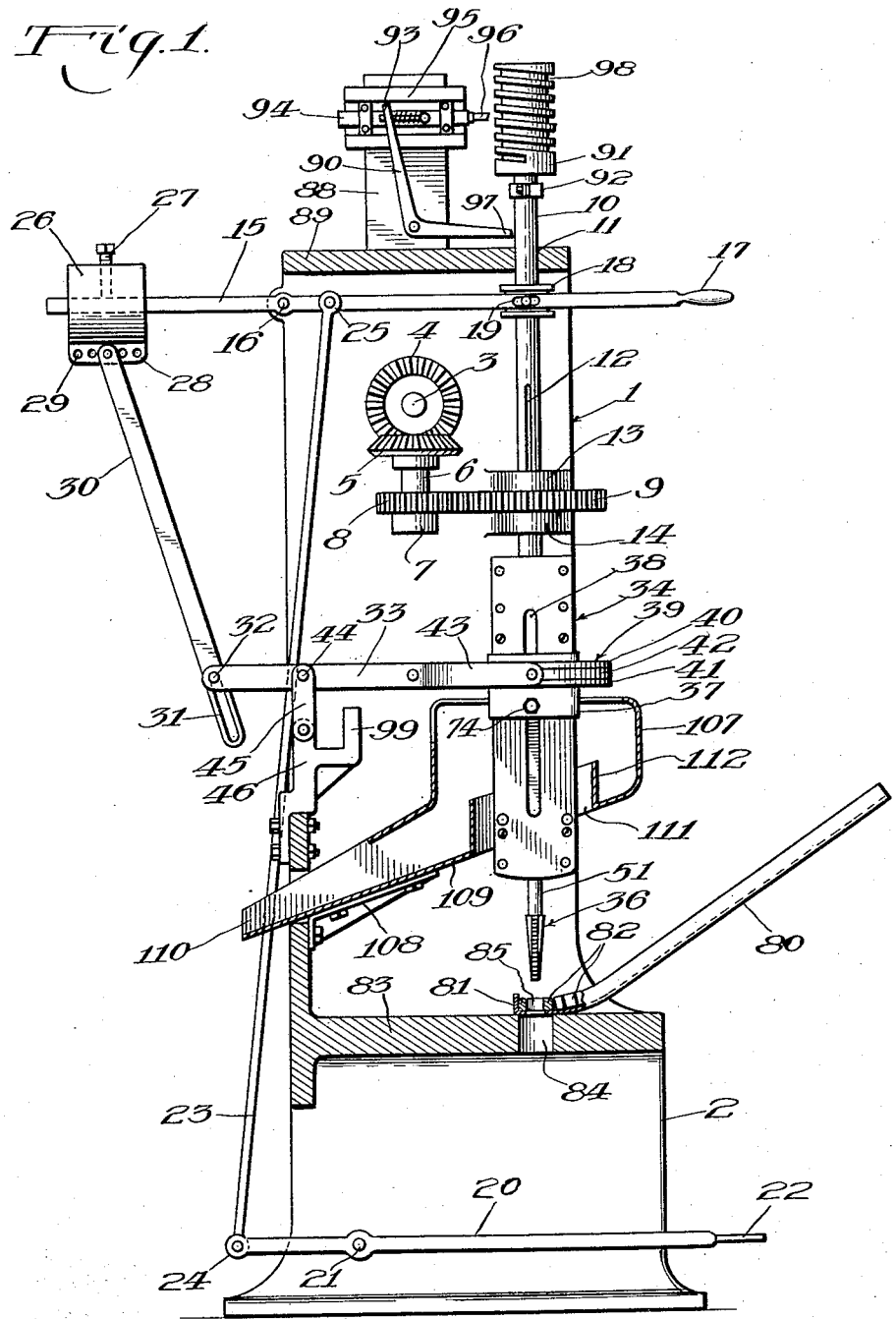

March 14, 1933. S. BARBER 1,901,579
CHUCK FOR NUT TAPPING MACHINES
Filed July 25, 1930 4 Sheets-Sheet 2
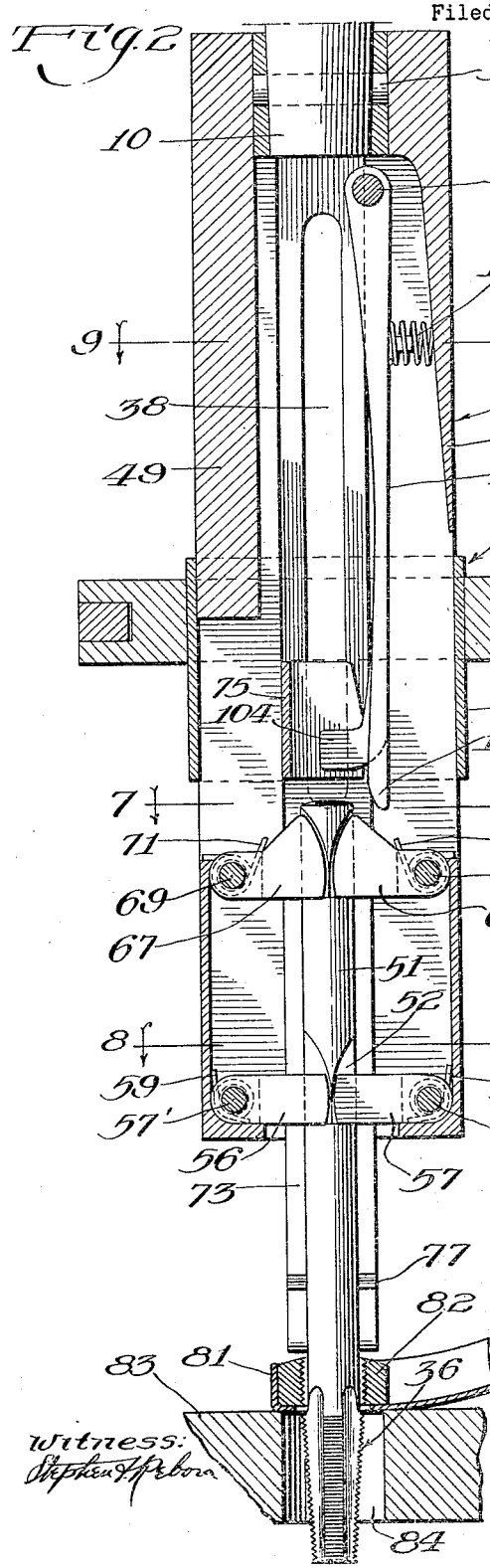
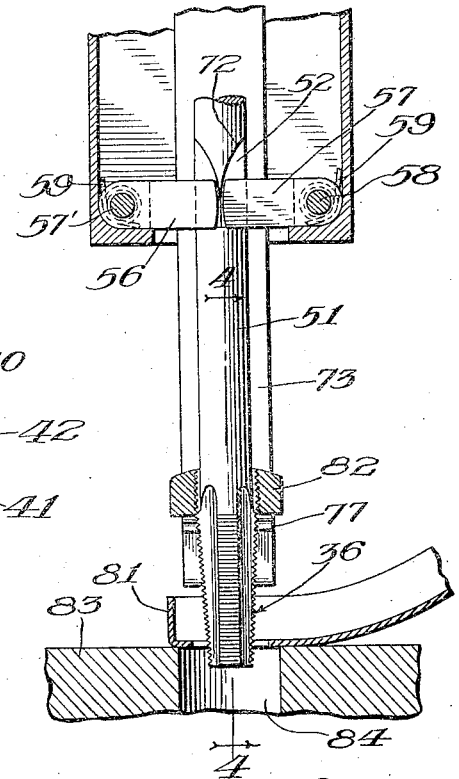
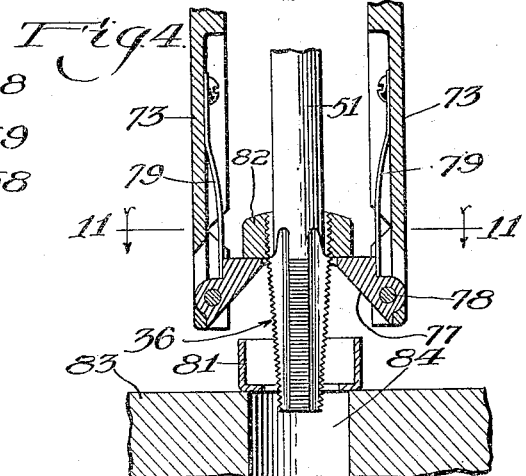
Inventor:
Sherman Barber,
By Frank L. Belknap
Atty.

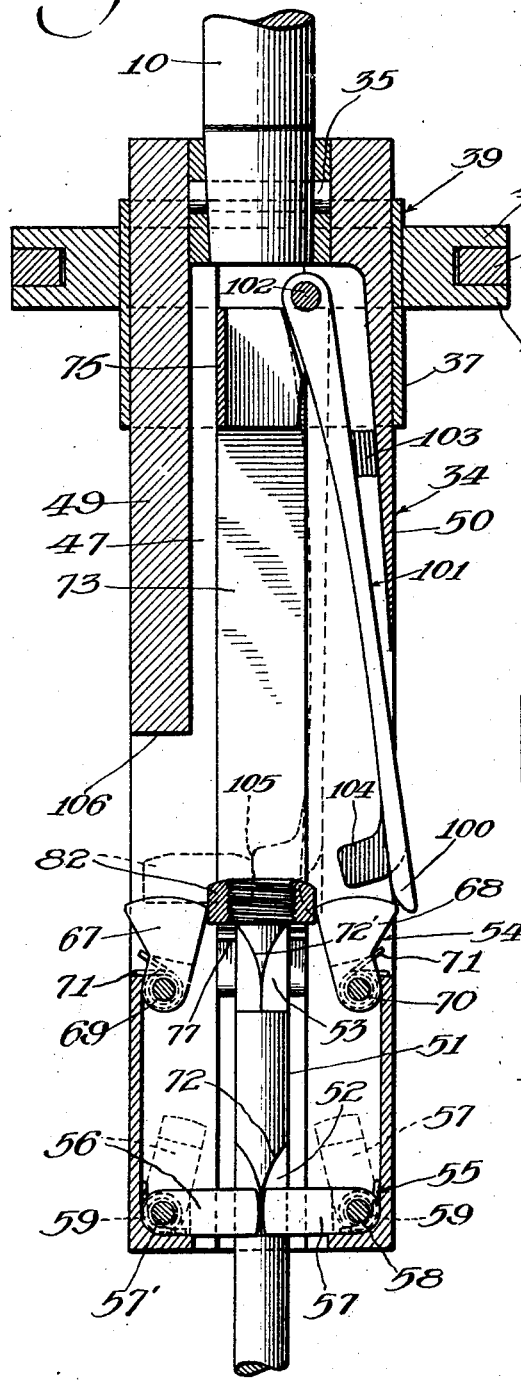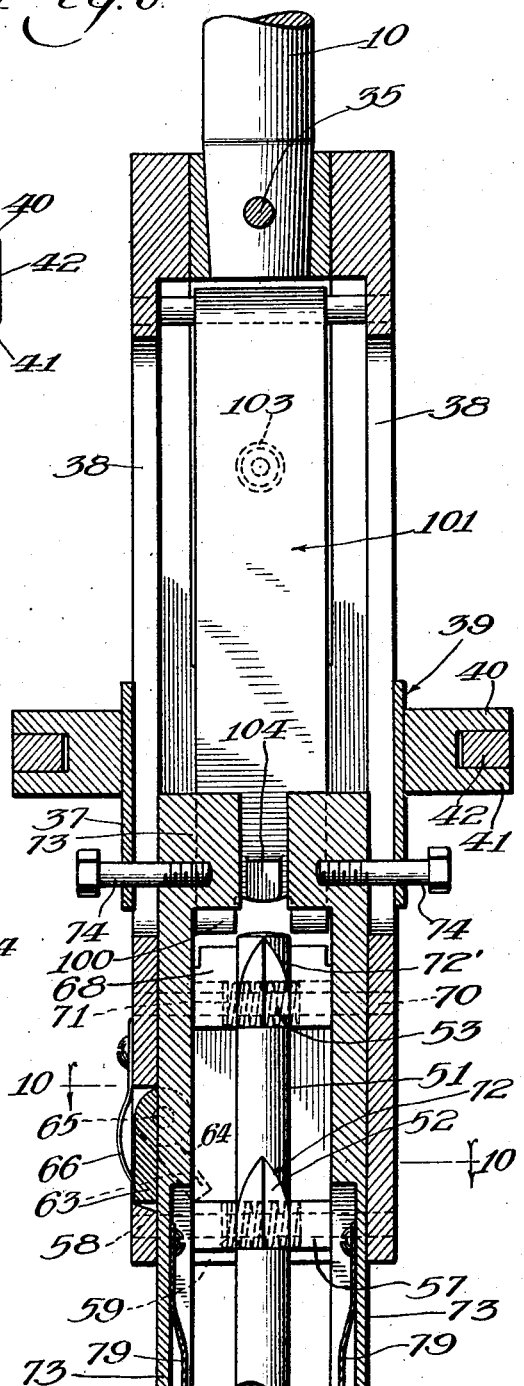

March 14, 1933. S. BARBER 1,901,579
CHUCK FOR NUT TAPPING MACHINES
Filed July 25, 1930 4 Sheets-Sheet 4
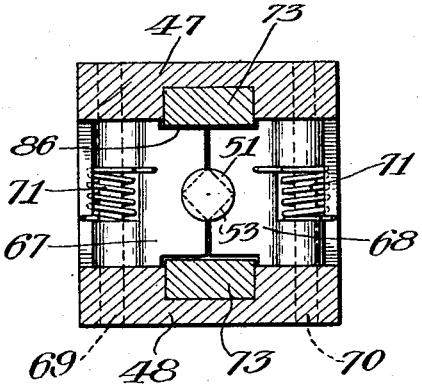
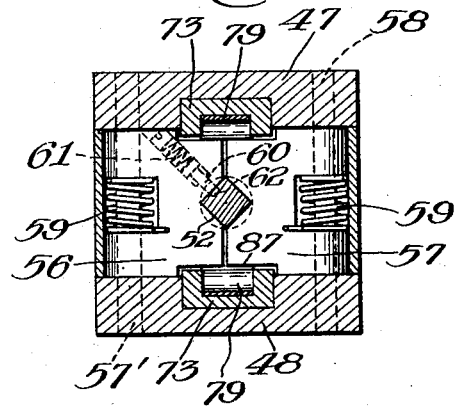
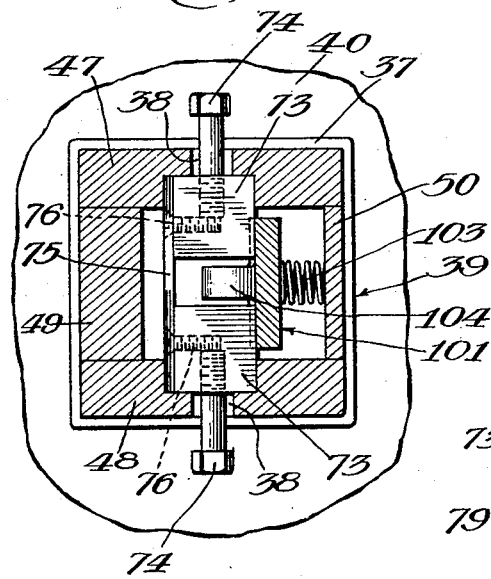
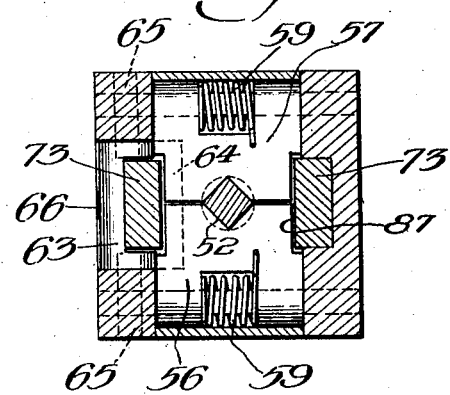
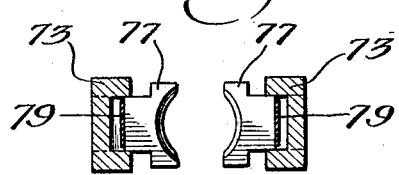

Patented Mar. 14, 1933

1,901,579

UNITED STATES PATENT OFFICE

SHERMAN BARBER, OF MAYWOOD, ILLINOIS

CHUCK FOR NUT TAPPING MACHINES

Application filed July 25, 1930. Serial No. 470,681.

This invention relates to improvements in a nut tapping device, and refers particularly to the provision of a chuck for removably holding the tap at a plurality of points along its shank, and means for alternately gripping and releasing the shank at each of said points in a predetermined sequential order.

The utility, objects and advantages of my invention will be apparent from the accompanying drawings and following detail description.

In the drawings, Fig. 1 is a side elevational view of a nut tapping machine utilizing my novel chuck.

Fig. 2 is a longitudinal cross-sectional view of the chuck, illustrating the disposition of its various constituent elements at the completion of the tapping operation.

Fig. 3 is a detail sectional view of a portion of the chuck at a period just subsequent to that shown in Fig. 2.

Fig. 4 is a detail sectional elevational view of the nut-gripping arms.

Fig. 5 is a sectional view of the chuck similar to that shown in Fig. 2 at a subsequent period of operation.

Fig. 6 is a sectional view of the chuck taken at right-angles to those shown in Figs. 2 and 5.

Fig. 7 is a transverse sectional view taken on line 7—7 of Fig. 2.

Fig. 8 is a transverse sectional view taken on line 8—8 of Fig. 2.

Fig. 9 is a sectional view taken on line 9—9 of Fig. 2.

Fig. 10 is a sectional view taken on line 10—10 of Fig. 6.

Fig. 11 is a detail top plan view of the nut carrying fingers.

Referring in detail to the drawings, 1 indicates a frame which may be mounted upon a base 2 or other suitable support. A drive shaft 3 may be journalled in frame 1 and may have mounted thereon a bevel gear 4 which may mesh with a co-operating bevel gear 5 mounted upon stub shaft 6. Shaft 6 may be journalled in bearing 7 and may have mounted intermediate its length pinion 8 which may mesh with spur gear 9. A spindle 10 may be journalled in frame 1 at 11 and may be free to both rotate and slide in a vertical direction. Spindle 10 may be provided intermediate its length with slot 12 in which a pin (not shown) attached to spur gear 9 is adapted to be disposed, the arrangement being such that the spur gear 9 and spindle 10 will revolve as a unit, and upon vertical motion of the spindle 10 the spur gear will be maintained in a fixed horizontal plane by means of the bearings 13 and 14, which may be mounted upon frame 1.

A lever 15 may be fulcrumed at the pivot point 16 upon frame 1, one end of said lever being provided with a handle 17. A collar 18 may be rigidly mounted upon spindle 10 and by means of a conventional yoke lever 15 may be pivotally attached thereto intermediate the handle 17 and the fulcrum 16. To compensate for angularity, slot 19 may be provided in lever 15. A second lever 20 may be fulcrumed intermediate its length, as at 21, upon base 2 and may be provided at one end thereof with a pedal 22. The opposite end of lever 20 may be pivotally connected to link 23 at 24, the other extremity of link 23 being pivotally attached to lever 15 intermediate fulcrum 16 and handle 17, as at 25.

A counter-weight 26 may be movably positioned upon the end of lever 15 on the opposite side of the fulcrum 16 from handle 17 and may be provided with set screw 27, by which means weight 26 may be maintained in a fixed position upon the end of lever 15. The lower portion of weight 26 may be provided with a lug 28 which in turn may be provided with a plurality of holes 29. A link 30 may be pivotally connected to the lug 28 at the lower portion of weight 26, and the point of pivotal connection therebetween may be arbitrarily set at any one of the holes 29. The opposite end of lever 30 may be provided with a slot 31 in which a pin 32 may be disposed, said pin being connected to one end of lever 33. A chuck 34 may be mounted upon the lower end of spindle 10 by means of pin 35, shown best in Figs. 2 and 5, said chuck being adapted to retain a tap 36 in operative position.

A band 37 may be positioned upon the outside of chuck 34 and may be longitudinally slidable thereon, the range of said slidability being determined by the length of slots 38 provided in lateral walls of said chuck. A yoke 39 may be rigidly mounted upon band 37 and may be provided with upper and lower flanges 40 and 41, respectively. An annular ring 42 may be rotatably disposed between flanges 40 and 41 and may be fastened at diametrically opposite sides to bifurcated arm 43, which forms one extremity of the lever 33. Lever 33 may be fulcrumed at 44, which is one extremity of connecting link 45, the opposite end of link 45 being pivotally mounted upon bracket 46, which in turn may be fixedly mounted upon frame 1.

It can readily be seen that by the mechanism herein described that upon downward motion of the spindle 10 chuck 34, and hence tap 36, will be lowered. This downward motion of these various mechanisms may be brought about by pulling downwardly on handle 17. In either case weight 26 will be rotated about fulcrum 16 in a clock-wise direction. As weight raises slot 31 at the lower end of link 30 will pass around pin 32 until the lower end of said slot contacts said pin. At this period one end of lever 33 will be raised, whereas the opposite end will be lowered, that is, the end which is connected to yoke 39. The arrangement is such that upon initial downward movement of spindle 10 yoke 39 will remain in a fixed horizontal position and by means of slot 31 an element of lost motion will exist in the system of linkages. When the lower portion of slot 31 contacts pin 32 yoke 39 will descend with the remaining descent of spindle 10, but because of the ratio of the lengths of the various lever arms hereinbefore described said yoke will descend at a greater rate than that of the spindle 10. The purpose of this differential movement will be hereinafter more fully described.

Chuck 34 may comprise a body of substantially rectangular cross-section having walls 47, 48, 49 and 50. It is to be understood, of course, that the chuck body may take any desired cross-section, for instance it may be oblong, circular, or may be of any desirable irregular section. As hereinbefore stated chuck 34 is adapted to retain tap 36 in operative position. Said tap may take the form of the usual tapper tap having a relatively long shank 51 which may be substantially circular in cross-section. As a feature of my invention, the shank 51 may be square intermediate its length, as at 52. The shank 51 may also be squared at its upper end 53. The purpose of this variation in cross-section will be hereinafter more fully brought out.

The shank 51 may be retained within chuck body 34 by means of sets of jaws 54 and 55 which engage the upper and intermediate squared portions of the shank 51, respectively. Referring particularly to Figs. 2 and 8, the lower set of jaws 55 may comprise gripping members 56 and 57 which may be pivoted, respectively, on opposite sides of the inner portion of the chuck 34, as at 57′ and 58. The members 56 and 57 are normally positioned in a plane transverse to the length of the shank 51, and the gripping edges of said members are squared to conform to the sectional contour of that portion of the shank 51 which they are adapted to contact. The members 56 and 57 may be maintained in this normal gripping position by means of coil springs 59 associated with each of said members. A pin 60 may be disposed within member 56 and may be spring actuated, as shown best at 61 in Fig. 8, the outer end of said pin protruding beyond the gripping edge of said member and being adapted to register with a notch 62 formed in one side of shank 51. To further maintain lower jaws 56 and 57 in operative contact with the squared portion 52 of shank 51 the end 63 of lug 64 pivoted at 65 and actuated inwardly by spring 66 may be maintained in contact with the upper faces of each of the members 56 and 57.

Referring particularly to Figs. 2 and 7, the upper set of jaws 54 may comprise two pivotally mounted co-operating members 67 and 68 mounted, respectively, upon each side of the inner portion of chuck 34, as at 69 and 70. Members 67 and 68 may be normally disposed at right angles to the length of the shank 51 and the gripping inner edges of the same may be squared to conform to the upper squared portion 53 of said shank. Members 67 and 68 may be maintained in normal operative position by means of springs 71.

Inasmuch as members 56 and 57 comprising the lower set of jaws 55, and members 67 and 68 comprising the upper set 54 are adapted to swing upwardly, the lines of demarcation between the square sections 52 and 53 of the shank 51 and the circular section thereof assume the form of curvilinear lines 72 and 72′. By this feature the members comprising the two sets of jaws may freely swing into and out of contact with the shank 51.

Two bars 73 of similar construction may be mounted upon band 37 which encompasses the outer surface of chuck 34 and may be connected to said band by means of screws or the like 74, said screws passing through each of the slots 38. Bars 73 may be disposed longitudinally within chuck body 34 and may be adapted to slide longitudinally therein with the motion of the yoke mechanism 39. The upper portions of each of the bars 73 may be joined by a spacer 75, which may be attached to each of the bars by screws or the like 76.

Fingers 77 may be pivotally mounted upon the ends of the bars 73, as at 78, and may be normally extended inwardly by means of leaf springs 79. The function and operation of bars 73 and fingers 77 will be hereinafter more fully described.

In operation, shaft 3 may be rotated by any suitable prime mover (not shown), which rotation may be transferred by means of the gear trains hereinbefore described to spindle 10. A chute 80 may be mounted adjacent frame 1 and may be adapted to discharge blank nuts 82 in sequence to a wrench or stop 81 positioned upon platform 83 immediately below the position of the rotating tap 36. Platform 83 may be apertured, as at 84, below the position of one of the nuts 82 held by the stop 81. Handle 17 may be pulled downwardly, or if desired, pedal 22 may be depressed until the lower portion of tap 36 engages in hole 85 in the blank nut 82 held by wrench 81. As the tap rotates the inner wall of the hole 85 may be threaded. Simultaneously with this tapping operation spindle 10 will descend, thereby elevating weight 26 and in turn raising link 30 until the lower portion of slot 31 contacts pin 32. At this period further depression or descent of the spindle 10 will be accompanied by downward motion of the yoke mechanism 39, but because of the ratios of the lever arms 15 and 33, said yoke will descend at a greater rate of speed than spindle 10.

As both the yoke 39 and spindle descend simultaneously, bars 73 fastened to said yoke will move longitudinally downwardly relative to chuck 34. Normally bars 73 are entirely housed within the body of the yoke 34, but upon this above mentioned relative motion between said bars and the chuck body the lower portion of said bars containing the swingably mounted fingers 77 will pass downwardly through apertures 86 provided between walls 47 and 48 and upper jaws 67 and 68, respectively. Upon passing through said apertures, fingers 77 are rotated upwardly against the tension of springs 79. As bars 73 continue to descend the lower end of one of said bars will contact the edge of lug 64 and will rotate same in a clock-wise direction against the impelling force of spring 66. Upon further descent of the bars 73 the ends of the same pass through apertures 87 provided between walls 47 and 48 and the lower jaws 56 and 57. At this period the lower ends of bars 73 protrude below the lower portion of chuck 34, as shown best in Figs. 2, 3 and 4, and said bars continue to descend until their lower ends occupy a position a relatively short distance from the upper portion of the wrench or stop 81.

At this period tap 36 will have passed entirely through aperture 85 of the blank nut 82, the relative positions of the various mechanisms being shown best in Fig. 2.

A support 88 may be mounted upon the upper portion 89 of frame 1 and may be adapted to serve as a mounting means for bell crank lever 90. A threaded member 91 may be mounted upon the upper end of spindle 10, and a collar 92 may be mounted immediately below said member. The upper end 93 of bell crank lever 90 may be disposed in contact with latch 94 which may be slidable relative to guide means 95, one end of said latch terminating in a pin 96 which upon depression of the lower end 97 of bell crank lever 90 will be brought into registration with one of the threads 98 of member 91. It is to be understood, of course, that this mechanism is entirely conventional and forms no part of my inventive concept.

When the tap 36 has passed entirely through nut 82 and the chuck mechanisms occupy the positions shown in Fig. 2, collar 92 will have descended into contact with end 97 of bell crank lever 90, thereby shifting latch 94 toward member 91 and engaging pin 96 in one of the threads 98. As the spindle continues to rotate, due to the engagement of the pin 96 and threads 98 the spindle 10 will be raised, raising chuck 34 and tap 36. As the spindle raises, collar 18 will also ascend, thereby depressing weight 26 and permitting link 30 to descend. Inasmuch as pin 32 at this period may be in contact with the lower portion of slot 31 link 30 will descend without affecting the position of lever 33. In other words, as tap 36 ascends, bars 73 and hence fingers 77 remain for a relatively short period of time, depending upon the length of slot 31, in their lowermost position as determined by stop 99. As tap 36 rises, the nut which has been tapped is carried upon the upper end of said tap until said nut contacts the lower inclined sides of fingers 77. Upon further ascent of the tap 36 said nut may be carried above the upper portion of fingers 77, whereupon said fingers actuated by springs 79 may snap inwardly below the lower surface of the nut. This period of operation is shown best in Figs. 3 and 4.

At this period the upper portion of slot 31 in link 30 may contact pin 32 and may depress that end of lever 33. As spindle 10 continues its ascent pin 32 will be further depressed, and hence yoke 39 will be raised; and inasmuch as the speed of travel of the yoke is swifter than the speed of travel of the spindle relative motion between bars 73 and chuck 34 will exist. As spindle 10 continues to raise, fingers 77 holding nut 82 will draw said nut upwardly from the top of tap 36 and will carry same upwardly along the shank 51 until said nut contacts the lower set of jaws 55, and inasmuch as dog 64 will be maintained in its rotated position against the impelling force of spring 66, members 56 and 57 may be rotated upwardly against the tension of springs 59, thereby permitting fingers 77 and nut 82 to pass upwardly by the lower set of jaws. During this operation the shank 51 of the tap 36 is retained in chuck 34 by the upper set of jaws 54. When fingers 77 and nut 82 pass the lower jaws 55 the same will return to normal position in contact with the square portion 52 of shank 51 by the impelling force of springs 59. At this period nut 82 encircles that portion of shank 51 included between jaws 54 and 55 and both jaws will be in operative position in contact with the shank of said tap.

As bars 73 continue to ascend fingers 77 and nut 82 will come in contact with upper jaws 54 and will rotate them upwardly against the tension of springs 71. At this period shank 51 of tap 36 will be retained by the lower jaws 55.

As the members 67 and 68 comprising the upper jaws 54 are rotated upwardly by the passage of the nut, member 68 contacts the lower end 100 of bar 101 which may be pivotally mounted at its opposite end at 102 and swings said bar against the compression of spring 103 to the position shown in full lines in Fig. 5. A lug 104 may be formed adjacent the lower end of bar 101 and when nut 82 is raised above the extreme upward position of members 67 and 68 said members will return to their normal position in contact with the squared portion 53 of the upper end of shank 51. Simultaneously with the return of the members 67 and 68 to normal position bar 101 will swing inwardly, being impelled by spring 103, and lug 104 will deliver an impacting force to nut 82 held upon the upper portion of fingers 77. This operation is clearly shown in dotted lines at 105 in Fig. 5.

Nut 82 upon being hit by lug 104 will be ejected through aperture 106 provided in the side of the body of the chuck 34. A hopper or guard 107 may be mounted upon frame 1 by means of bracket 108 and the upper end thereof may surround a portion of chuck 34. When nut 82 is ejected from said chuck the same will fall to the lower surface 109 of hopper 107 and may be delivered through spout 110 to any desirable receptacle (not shown). To prevent the ejected nut from falling between chuck 34 and the aperture 111 provided in hopper 107, a collar or deflecting means 112 may be disposed upwardly from the surface 109 of said hopper and may surround the rotating chuck 34.

It is apparent that herein is provided a chuck for a nut tapping machine which is susceptible of automatic or semi-automatic operation. The blank nuts may be automatically fed to the machine by conventional feed means (not shown) which are familiar to those skilled in the art. When the chuck 34 and yoke 39 have reached their uppermost positions, pin 96 may disengage from threads 98, permitting spindle 10, by a suitable disposition of weight 26 upon lever arm 15, to descend thus positioning tap 36 in operative position with respect to another blank nut 82. By suitable selection of the weight 26 sufficient downward pressure may exist upon tap 36 to permit the same to start the threading operation. In changing the position of weight 26 upon arm 15 the difference thus caused in the effective length of link 30 may be compensated by connecting said link at a different aperture 29 in lug 28.

I am aware that many modifications of my device may be made and many details of construction changed without departing from the spirit of my invention, hence I do not wish to be limited except as necessitated by the prior art.

I claim as my invention:

1. In combination, a chuck for a nut tapping machine which comprises, a body, means for rotating said body, a plurality of sets of openable jaws disposed in said body for holding the shank of a tap with the threaded portion downwardly, and means for moving a threaded nut from the upper portion of the tap upwardly along the shank of the tap and successively opening and closing each set of jaws.

2. In combination, a chuck for a nut tapping machine which comprises, a body, means for rotating said body, a plurality of sets of openable jaws disposed in said body for holding the shank of a tap with its threaded end downwardly, means for moving a threaded nut from the upper portion of the tap along the shank of the tap and successively opening and closing each set of jaws, said latter means comprising a plurality of bars slidably disposed within said body, a spring actuated finger positioned at one end of each of said bars, and means for moving said bars longitudinally at a differential speed with respect to said body.

3. In combination, a chuck for a nut tapping machine which comprises, a body, means for rotating said body, a plurality of sets of jaws disposed in said body for holding the shank of a tap with its threaded end downwardly, each set of jaws comprising a pair of swingably mounted gripping members, and means for positively raising a threaded nut from the upper portion of the tap along the shank of the tap and successively alternately swinging the gripping members into and out of operative contact with the tap shank.

4. In combination, a chuck for a nut tapping machine which comprises, a body, means for rotating said body, a plurality of sets of jaws disposed in said body for holding the shank of a tap with its threaded end downwardly, each set of jaws comprising a pair of swingably mounted spring actuated gripping members, a plurality of bars slidably associated with said body, a spring actuated finger positioned at one end of each of said bars for raising a completely threaded nut from the top of the tap upwardly along the shank of said tap, thereby successively swinging said gripping members alternately into and out of operative contact with the tap shank.

5. In combination, a chuck for a nut tapping machine which comprises, a body, means for rotating said body, a plurality of sets of openable jaws disposed in said body for holding the shank of a tap with its threaded end downwardly, means for moving a threaded nut from the upper portion of the tap upwardly along the shank of the tap successively opening and closing each set of jaws, and means intermediate said body for ejecting the threaded nut from the body.

6. In combination, a chuck for a nut tapping machine which comprises, a body, means for rotating said body, a plurality of sets of openable jaws disposed in said body for holding the shank of a tap with its threaded portion downwardly, means for moving a threaded nut from the upper portion of the tap along the shank of the tap successively opening and closing each set of jaws, and means for ejecting the threaded nut from the body, comprising a spring actuated ram which is set by the opening of the last set of jaws and released by their closing.

7. In combination, a chuck for a nut tapping machine which comprises, a body, means for rotating said body, a plurality of sets of openable jaws disposed in said body for holding the shank of a tap with its threaded end downwardly, means for moving a threaded nut from the upper portion of the tap along the shank of the tap successively opening and closing each set of jaws, means for ejecting the threaded nut from the body, comprising a spring actuated ram which is set by the opening of the last set of jaws and released by their closing, and means for retrieving said ejected nut comprising a hopper surrounding said chuck body and spaced therefrom.

In testimony whereof I affix my signature.

SHERMAN BARBER.